3,081,161
ABRASIVE ARTICLES AND THEIR
MANUFACTURE
John Cantrell, Sale, England, assignor, by mesne assignments, to The Carborundum Company, Niagara Falls, N.Y., a corporation of Delaware
Filed Apr. 19, 1960, Ser. No. 23,226
Claims priority, application Great Britain Apr. 23, 1959
16 Claims. (Cl. 51—298)

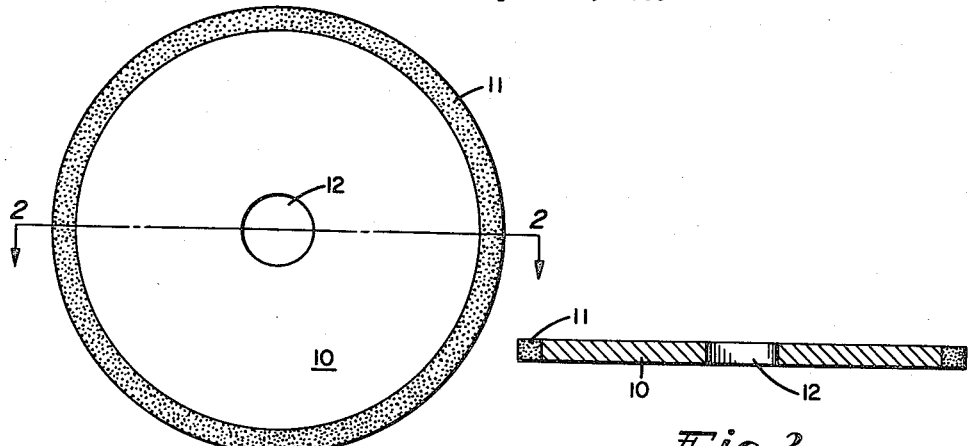
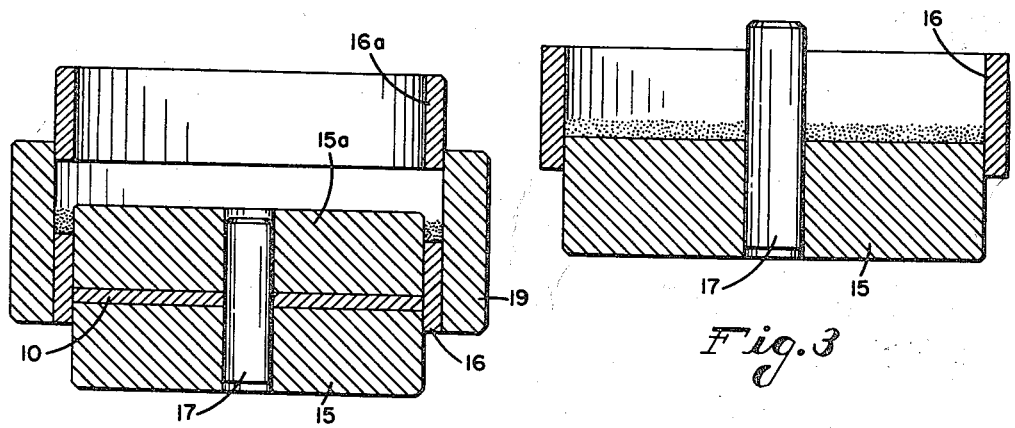
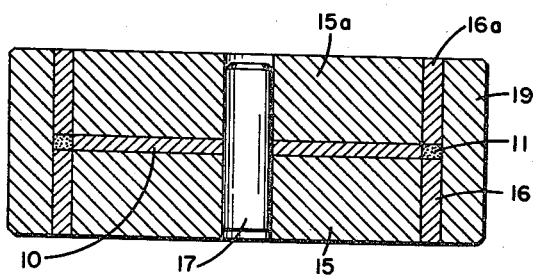
INVENTOR.
JOHN CANTRELL
BY K. W. Brownell
ATTORNEY

United States Patent Office 3,081,161
Patented Mar. 12, 1963

This invention relates to abrasive articles, and particularly to diamond abrasive articles and their bond composition, and to methods of making them. The bond may be resinoid, metal or ceramic, all three types of bond being well-known and commonly used in the manufacture of diamond abrasive articles.

An object of the present invention is to provide an improved diamond abrasive article.

It is a further object of this invention to provide a means of modifying or controlling the grinding characteristics of a diamond abrasive grinding wheel.

A more general object of the invention is to provide abrasive articles having improved abrading characteristics.

Another object of the invention is to provide rotary abrasive articles having improved performance properties, together with practical methods of making such articles.

According to one embodiment of this invention, a diamond abrasive article consists of diamond abrasive grains bonded by a resinoid, metal or ceramic bond composition to which has been added a small amount, up to about 5% by weight of the bond, of boron nitride powder.

It has already been proposed to use boron nitride as a solid lubricant.

Two other materials namely graphite and molybdenum disulphide are widely used as solid lubricants and both are considerably cheaper than boron nitride. Nevertheless, attempts to achieve improvements in diamond abrasive wheels by introducing graphite or molybdenum disulphide into the bond have not produced any marked improvement in diamond grinding wheel performance.

The inclusion of boron nitride in the bond composition in accordance with the invention, produced marked improvement in performance particularly in the case of hard grade wheels. The boron nitride has the effect of producing a softer wheel grade without any appreciable sacrifice of wheel life and sometimes with an actual increase of wheel life whereas normal methods of achieving a softer grade automatically reduce the overall bond strength of the wheel and result in shorter wheel life. Microscopic examination of the grinding face of experimental wheels suggests that the boron nitride acts as a barrier material which prevents the grinding face from becoming loaded or glazed by the material being ground.

This method of making the diamond abrasive articles of this invention may be the same as for the corresponding articles without boron nitride, except that when preparing the mix boron nitride powder is included as an extra ingredient but the mixing and molding processes remain otherwise unchanged.

The boron nitride used in carrying out the present invention may be any commercial grade of boron nitride material available on the market, as for example, that made according to Taylor Patent No. 2,808,314.

In the drawing:
FIGURE 1 is a plan view of a peripheral diamond grinding wheel, constructed in accordance with one embodiment of this invention;

FIGURE 2 is a section taken on the line 2—2 of FIGURE 1, looking in the direction of the arrows;

FIGURE 3 is an axial section of the lower portion of a mold that is adapted to press a backing disc;

FIGURE 4, is an axial section of a mold for pressing the abrasive disc, in an open position; and FIGURE 5 is an axial section thereof in pressing position.

Several embodiments of the invention will now be described by way of example.

EXAMPLE 1

*Resinoid Bonded Diamond Wheel*

A 180 grit diamond resinoid wheel normally used for grinding tungsten carbide milling cutters was slightly too hard for this purpose and suffered some glazing and occasional failure due to generation of heat.

A wheel of the same composition but with 2% boron nitride powder included in the mix was found to be more free cutting and non-glazing. Wheel life was actually better in terms of tungsten carbide removal than for the standard wheel.

Comparative figures for weight of carbide removed per carat of diamond in the wheel were:

|  | Gm. per carat |
|---|---|
| Standard wheel | 203 |
| Wheel of same composition but including 2% boron nitride | 261 |

The invention is applicable to resinoid bonds generally. Usually such bonds are two-step phenol-formaldehyde resins, but other resinoid bonding resins are known and the boron nitride can be used in conjunction with them. One preferred type of resin bond, for use in connection with this invention, is the alkaline earth-catalyzed type of one-step phenol-formaldehyde resin described in U.S. Patent 2,769,700, granted November 6, 1956, to George J. Goepfert.

EXAMPLE 2

*Metal Bonded Diamond Wheel*

In the case of hot-pressed metal bonded diamond grinding wheels there is normally only one grade or hardness of wheel obtained with any given composition of the metal bond since the aim is to produce a diamond containing metal compact of maximum density.

Any attempt to produce a wheel at lower than maximum density results in inconsistency and loss of strength of the metal compact. If however boron nitride is used in accordance with this invention, while still pressing to maximum density, the boron nitride has the effect of softening the metal bond so that it is possible to obtain in this way a range of grades or hardnesses, using but one composition of metal bond with different amounts of boron nitride as an additive.

A metal additive, as contrasted to the boron nitride additive, would in effect be a change in composition of the metal bond. It is possible to obtain softer grade wheels by using a weaker metal bond but the basis of this invention is to use a metal bond which has desirable physical characteristics and modify the hardness grade of the wheel without altering the metal composition. This is achieved by using boron nitride as the additive.

To evaluate the effect of boron nitride additions on metal bonds, test pieces have been eroded by an abrasive slurry under controlled conditions. Table 1 gives the results obtained on a 15 minute erosion test of a ½″ x ½″ section bronze test piece formed from metal powders with increasing additions of boron nitride powder.

TABLE I

| Metal bond composition: | Wear on test piece, inches |
|---|---|
| Bronze (control) | .021 |
| Bronze+1% BN | .027 |
| Bronze+2% BN | .058 |
| Bronze+3% BN | .072 |
| Bronze+4% BN | .094 |
| Bronze+5% BN | .091 |

This increase in wear is not accompanied by any substantial drop in tensile strength of bond thus enabling greater freedom of cut to be obtained without the heavy sacrifice in wheel life which a weaker metal bond would involve.

The invention has general application to metallic bonds of many different kinds, such as, for example, iron, copper, brass, cobalt, Monel metal, and many other metals and alloys. The expression, "metallic bonds" is intended to encompass brazed, sintered and hot pressed bonds, and, as well, bonds formed from powdered metallic mixtures and from powdered metallic compounds such as tungsten carbide. Specific metallic bonds, to which the boron nitride powder can be added, include, for example, those that are formed from a mixture consisting primarily of powdered copper and powdered tin, such as are disclosed in U.S. Patent No. 2,137,329, granted November 22, 1938, to Boyer.

One preferred embodiment of the invention modifies a composition containing a minor proportion of diamond abrasive grain together with a powdered bond comprising a major proportion of copper and up to about 20% by weight of the bond of tin, by the addition thereto of ½% to 5% by weight of the bond of powdered boron nitride. In one specific embodiment of the invention, an abrasive composition of the type just described, and containing a bond of 82% copper powder and 18% tin powder, modified by the addition of 2% boron nitride powder, was placed in a mold about a prepressed disc. This disc comprised a mixture, in parts by weight, of 55 parts of 200 mesh size iron powder, 36 parts of copper powder, 9 parts of tin powder, and 2 parts of a phos-copper powder containing 7%–9% by weight of phosphorous, compacted at 15,000 to 20,000 p.s.i. The abrasive composition was pressed at a pressure as high as 50,000 p.s.i., to compact it and unite it with the backing disc. After firing in a furnace in a reducing atmosphere, the wheel was sound, and gave excellent grinding results. A firing temperature of about 700° C. to 750° C. was adequate.

The metal powders used in carrying out the present invention may be of the commonly available commercial types and should be comparatively pure to permit regulation of the extent of alloying by adjustment of the sintering temperature and time. Such metal powders are preferably of 200 mesh and finer size.

The molding of a peripheral grinding wheel of the type shown in FIGURES 1 and 2 in which a metal core or backing 10 surrounds an arbor hole 12 and has formed integrally therewith an abrasive rim 11 is shown in FIGURES 3, 4, and 5. In FIGURE 3 a mold block or plunger 15 is provided with a central pin or plug 17 and a closely fitting mold ring 16. A mixture of iron, copper, and tin powders in an amount calculated to be sufficient to make a wheel center of the desired thickness is then placed on plunger 15 in the cavity formed by the ring 16 and pin 17 and is spread evenly therein.

Upper mold plunger 15a (FIGURE 4) is then put in place and consolidating pressure which may be as high as 15,000 to 20,000 p.s.i. is applied to the plungers 15 and 15a. After this preliminary consolidation of the backing or support there is placed around mold ring 16, as shown in FIGURE 4, an outer mold ring 19 and the mixture of diamond abrasive and metal powder needed for the abrasive rim is spread evenly in the space between plunger 15a and mold ring 19. An upper ring 16a is then inserted into the assembly in such position that it will operate to compress the abrasive mix against ring 16 and the whole mold assembly is again subjected to pressure. As shown in FIGURE 5 the abrasive rim and the backing or support are brought together into line as the mold is closed and suitable pressure which may in some cases be as much as 50,000 to 75,000 p.s.i. or more is then applied. The effect of this pressure is to cause unification of the abrasive rim and the metallic backing or supporting portion so that the pressed wheel may be handled as an integral body without danger of separation.

After removal from the mold, abrasive wheels made in accordance with the present invention may be sintered in any convenient or desired manner. A simple and effective manner is by supporting the wheel on a bat or plate and placing it in a heated furnace having a reducing or non-oxidizing atmosphere. The wheel is kept in the furnace for the necessary period of time to obtain thorough sintering, the hardness of the bond being determined largely by the temperature at which the sintering is carried out. This is well known in the art and the hardness may be regulated as desired.

In the foregoing description abrasive wheels of the type shown in FIGURES 1 and 2 have been described as having a metal support or core which extends from the abrasive peripheral rim to the arbor hole. It will be realized that with large wheels the amount of metal in such a construction will be large and accordingly the weight of the wheel will be excessive. With large wheels, therefore, it will frequently be desired to have the metal core or support extend inwardly from the abrasive rim only a relatively small distance, of the order of 1 to 18 times the thickness of the abrasive rim depending on the size of the wheel, and to have the rest of the core or support formed from some lighter material such as a moldable plastic which can be attached in any suitable manner to the metal support or which may be molded in situ inside the metal supporting ring. Wheel constructions of this type are intended to be within the scope of the present invention since the advantages of the present invention are inherent therein even though the entire support is not formed of metal.

The proportion of diamond employed in the abrasive rim of the wheel is not critical and will vary with the purpose for which the wheel is intended.

EXAMPLE 3

*Vitrified Diamond Wheel*

In the case of vitrified diamond grinding wheels it is desirable to mold the wheels to maximum density. Variation in grade or hardness therefore is normally achieved by using different ceramic bond compositions. By introducing boron nitride it has been possible to use one bond composition and still obtain varying degrees of hardness. Thus the use of a bond which is too hard but which otherwise has desirable characteristics becomes practicable.

By way of example, 6" diameter 3⁄16" thick 120 grit vitrified diamond wheels were made with a very hard bond and with ½, 1 and 2% boron nitride additions. These wheels were used in a surface grinding test of "M" grade Cutanit tungsten carbide having a Vickers Pyramid Number of 1425–1500 under controlled conditions.

The effect of the boron nitride additions was evaluated by measuring the weight of carbide removed in relation to the weight of diamond abrasive lost during the grinding operation. The results are given in Table II.

TABLE II

| Wheel: | Gm. carbide removed/carat of diamond lost |
|---|---|
| Vitrified bond (control) | Too hard for test. |
| Vitrified bond+½% BN | 38.8. |
| Vitrified bond+1% BN | 20.6. |
| Vitrified bond+2% BN | 18.8. |

Vitreous bonds of many types have been modified successfully by the addition of boron nitride in accordance with this invention. One suitable bond consists, for example, of a glass, such as a borosilicate glass, a phosphate glass, or a soda-lime glass, containing a flux that reduces the melting temperature sufficiently so the glass is pourable at 1600° F. to 1800° F. Another satisfactory bond is a prefritted bond comprising boric oxide and an oxide of lead or zinc or a mixture of lead and zinc oxides, having a softening point under about 750° C. and a low silica content. A preferred bond is the vitrified reaction product of 55% to 80% talc, 3% to 15% feldspar, 5% to 20% ball clay, and 5% to 22% silicon carbide, and containing about 5% to 30% of a glassy phase. A boron nitride addition of ½% to 5% is efficacious.

The optimum boron nitride additions in any particular case will depend on conditions of use such as the nature of the work being ground, the amount of stock removal required, whether grinding is carried out wet or dry and many other factors.

The figures in Table II serve to show that boron nitride additions do have an effect and in this particular example ½% boron nitride appears to give the best results. On another operation the wheel with ½% boron nitride may be too hard and a greater addition will be needed for optimum results.

I claim:

1. In an abrasive article, an abrasive portion which consists essentially of diamond abrasive grains and a bond for said abrasive grains, said bond being selected from the class consisting of vitrified, thermoset resinoid, and metallic bonds and containing as an additive and essentially the sole nitride therein a small amount, from ½% up to about 5% by weight of the bond, of boron nitride distributed therein in finely divided form.

2. An abrasive article as set forth in claim 1 in which said bond is a vitrified one.

3. An abrasive article as set forth in claim 2 in which said bond is a glass.

4. An abrasive article as set forth in claim 1 in which said bond is a thermoset resinoid one.

5. An abrasive article as set forth in claim 1 in which said bond is a metallic one.

6. An abrasive article as set forth in claim 5 in which said metallic bond is sintered.

7. An abrasive article as set forth in claim 5 in which said bond is sintered bronze.

8. A grinding wheel having an abrasive portion which consists essentially of a bond selected from the class consisting of vitrified, thermoset resinoid, and metallic bonds having distributed and firmly held therein diamond abrasive grains, said bond also having distributed therein as an additive and essentially the sole nitride therein a small amount, from ½% up to about 5% by weight thereof, of a finely divided boron nitride.

9. A grinding wheel as set forth in claim 8 in which said bond is a vitrified one.

10. A grinding wheel as set forth in claim 8 in which said bond is a thermoset resinoid one.

11. A grinding wheel as set forth in claim 8 in which said bond is a metallic one.

12. A raw mix for the manufacture of an abrasive article which consists essentially of a mixture of diamond abrasive grain and a powdered bonding material selected from the class consisting of vitrifiable, thermosetting resinoid, and metallic bonds which contains as an additive and essentially the sole nitride therein a small amount, from ½% up to about 5% by weight of said material, of finely divided boron nitride.

13. A raw mix as set forth in claim 12 in which said powdered bonding material is a vitrifiable mixture of ceramic materials.

14. A raw mix as set forth in claim 12 in which said powdered bonding material is a sinterable mixture of metal powders.

15. A method of adjusting the hardness grade of a diamond abrasive article which comprises the steps of mixing with the powdered bonding material diamond abrasive grain and a small amount, from ½% up to about 5% by weight of said bond, of an additive consisting essentially of finely divided boron nitride, shaping said article, and heating said bond to form a solid article.

16. A method as set forth in claim 15 in which said bonding material is a mixture of metal powders and the heating produces sintering and alloying of said powders.

References Cited in the file of this patent

UNITED STATES PATENTS

| | | |
|---|---|---|
| 1,528,543 | Hartmann | Mar. 3, 1925 |
| 2,073,590 | Sanford | Mar. 9, 1937 |
| 2,216,135 | Rainier | Oct. 1, 1940 |
| 2,306,423 | Bernstorff | Dec. 29, 1942 |
| 2,475,565 | Houchins | July 5, 1949 |
| 2,561,709 | Norling | July 24, 1951 |
| 2,839,413 | Taylor | June 17, 1958 |
| 2,887,393 | Taylor | May 19, 1959 |